United States Patent
Bremler-Barr et al.

(10) Patent No.: US 8,458,354 B2
(45) Date of Patent: Jun. 4, 2013

(54) MULTI-PATTERN MATCHING IN COMPRESSED COMMUNICATION TRAFFIC

(75) Inventors: Anat Bremler-Barr, Ramat Hasharon (IL); Yaron Koral, Hod Hasharon (IL); Victor Zigdon, Herzliya (IL)

(73) Assignee: Interdisciplinary Center Herzliya, Herzliya (IL)

( * ) Notice: Subject to any disclaimer, the term of this patent is extended or adjusted under 35 U.S.C. 154(b) by 160 days.

(21) Appl. No.: 13/013,835

(22) Filed: Jan. 26, 2011

(65) Prior Publication Data

US 2011/0185077 A1    Jul. 28, 2011

Related U.S. Application Data

(60) Provisional application No. 61/298,552, filed on Jan. 27, 2010.

(51) Int. Cl.
  *G06F 17/30* (2006.01)
(52) U.S. Cl.
  USPC .......................................................... 709/231
(58) Field of Classification Search
  None
  See application file for complete search history.

(56) References Cited

U.S. PATENT DOCUMENTS

| | | | | |
|---|---|---|---|---|
| 5,455,577 A * | 10/1995 | Slivka et al. | ..... | 341/51 |
| 6,883,137 B1 * | 4/2005 | Girardot et al. | ..... | 715/242 |
| 7,051,126 B1 * | 5/2006 | Franklin | ..... | 710/68 |
| 2002/0021838 A1 * | 2/2002 | Richardson et al. | ..... | 382/181 |
| 2004/0111439 A1 * | 6/2004 | Richardson et al. | ..... | 707/200 |
| 2004/0190635 A1 * | 9/2004 | Ruehle | ..... | 375/253 |
| 2005/0149888 A1 | 7/2005 | Gunawardana | | |
| 2006/0050968 A1 * | 3/2006 | Oh et al. | ..... | 382/219 |
| 2008/0046423 A1 * | 2/2008 | Khan Alicherry et al. | ..... | 707/6 |
| 2009/0228474 A1 | 9/2009 | Chiu et al. | | |

OTHER PUBLICATIONS

Aho et al., "Efficient String Matching: An Aid to Bibliographic Search", Communications of the ACM, vol. 18, No. 6, pp. 333-340, Jun. 1975.
Deutsch, P., "DEFLATE Compressed Data Format Specification version 1.3", Network Working Group, RFC 1951, May 1996.
Ziv et al., "A Universal Algorithm for Sequential Data Compression", IEEE Transactions on Information Theory, vol. IT-23, No. 3, pp. 337-343, May 1977.
Navarro et al., "A General Practical Approach to Pattern Matching over Ziv-Lempel Compressed Text", Tenth Annual Symposium on Combinatorial Pattern Matching, Warwick University, UK, Jul. 22-24, 1999.
Farach et al., "String Matching in Lempel-Zip Compressed Strings", 27th Annual ACM Symposium on the Theory of Computing, pp. 703-712, Las Vegas, USA, May 29-Jun. 1, 1995.
Kumar et al., "Algorithms to Accelerate Multiple Regular Expressions Matching for Deep Packet Inspection", Proceedings of ACM SIGCOMM'06, Pisa, Italy, Sep. 12-15, 2006.

(Continued)

*Primary Examiner* — Hassan Kizou
*Assistant Examiner* — Tejis Daya
(74) *Attorney, Agent, or Firm* — D. Kligler I.P. Services Ltd.

(57) ABSTRACT

A method for processing data includes accepting a specification of a plurality of patterns, each pattern defining a respective uncompressed sequence of symbols. Multi-pattern matching is applied to an incoming stream of compressed communication traffic containing compression metadata so as to identify the patterns occurring in the stream while using the compression metadata to skip over parts of the stream.

33 Claims, 10 Drawing Sheets

OTHER PUBLICATIONS

Wu et al., "A Fast Algorithm for Multi-Pattern Searching", Technical Report TR-94017, Department of Computer Science, University of Arizona, May 1994.
U.S. Appl. No. 12/985,354, filed Jan. 6, 2011.
Fisk et al., "Applying Fast String Matching to Intrusion Detection", Technical Report CS2001-0670, year 2002.
Deutsch, P., "Gzip file format specification version 4.3", Network Working Group, RFC 1952, May 1996.
Website Optimization, LLC., "Introduction to Web Site Optimization", Jan. 2007.
Huffman D., "A Method for the Construction of Minimum-Redundancy Codes", Proceedings of IRE, p. 1098-1101, Sep. 1952.
Zlib, "A Massively Spiffy Yet Delicately Unobtrusive Compression Library", Apr. 19, 2010 (www.zlib.net).
Boyer et al., "A fast string searching algorithm", Communications of the ACM, vol. 20, No. 10, pp. 762-772, Oct. 1977.
SNORT Users Manual, Apr. 15, 2008.
Song et al., "A memory efficient multiple pattern matching architecture for network security", INFOCOM 2008, pp. 166-170, Phoenix, USA, Apr. 13-17, 2008.
Van Lunteren, J., "High-performance pattern-matching engine for intrusion detection", INFOCOM 2006, 25th IEEE International Conference on Computer Communications, pp. 1-13, Barcelona, Spain, Apr. 23-29, 2006.
Dimopoulos et al., "A memory efficient reconfigurable aho-corasick fsm implementation for intrusion detection systems", Proceedings of the 2007 International Conference on Embedded Computer Systems: Architectures, Modeling and Simulation (IC-SAMOS 2007), pp. 186-193, Samos, Greece, Jul. 16-19, 2007.
Tuck et al., "Deterministic memory efficient string matching algorithms for intrusion detection", INFOCOM 2004, Hong Kong, China, Mar. 7-11, 2004.
Alicherry et al., "High speed pattern matching for network ids/ips", 14th IEEE International Conference on Network Protocols, pp. 187-196, Santa Barbara, USA, Nov. 12-15, 2006.
Amir et al., "Let sleeping files lie: Pattern matching in z-compressed files", Journal of Computer and System Sciences, vol. 52, issue 2, pp. 299-307, Apr. 1996.
Kida et al., "Shift-and approach to pattern matching in lzw compressed text", 10th Annual Symposium on Combinatorial Pattern Matching, Warwick University, UK, Jul. 22-24, 1999.
Navarro et al., "Boyer-moore string matching over ziv-lempel compressed text", Proceedings of the 11th Annual Symposium on Combinatorial Pattern Matching, pp. 166-180, Montreal, Canada, Jun. 21-23, 2000.
Klein et al., "A new compression method for compressed matching", Proceedings of data compression conference DCC—2000, pp. 400-409, Snowbird, USA, Mar. 28-30, 2000.
Bremler-Barr et al., "Accelerating multi-patterns matching on compressed HTTP Traffic", INFOCOM 2009, Rio de Janeiro, Brazil, Apr. 19-25, 2009.
Manber U., "A text compression scheme that allows fast searching directly in the compressed file", ACM Transactions on Information Systems (TOIS), vol. 15, issue 2, pp. 124-136, Apr. 1997.
Takeda et al., "Speeding up string pattern matching by text compression. the dawn of a new era", Information Processing Society of Japan Journal, vol. 24, No. 3, pp. 370-384, Mar. 2001.
Ziviani et al., "Compression: A key for next generation text retrieval systems", IEEE Computer, vol. 33, No. 11, Nov. 2000.
Fisk et al., "Fast Content-Based Packet Handling for Intrusion Detection", UCSD Technical Report CS2001-0670, May 2001.
Ristic, I., "Introducing Mod Security", Nov. 26, 2003.
Cormen et al., "Introduction to Algorithms", second edition, The MIT Press and McGraw-Hill Book Company, 2001.
Hopcroft et al., "Introduction to Automata Theory, Languages, and Computation", Chapter 2, pp. 37-81, second edition, Addison-Wesley, 2001.
Port 80 Software, "Port80 surveys the top 1000 corporations' web servers", years 2002-2007.

U.S. Appl. No. 61/466,012, filed Mar. 22, 2011.
Behr, A., "Midrange Firewalls Face Off", Jul. 23, 2004 (http://www.infoworld.com/print/14089).
Fielding et al.., "Hypertext Transfer Protocol—HTTP/1.1", Network Working Group, RFC 2616, Jun. 1999.
Tan et al., "Architectures for Bit-Split String Scanning in Intrusion Detection", IEEE Micro, No. 1, pp. 110-117, Jan.-Feb. 2006.
Liu et al.., "A Fast Pattern-Match Engine for Network Processor-based Network Intrusion Detection System", Proceedings of the International Conference on Information Technology: Coding and Computing, pp. 97-101, Las Vegas, USA, Apr. 5-7, 2004.
Pao et al., "Pipelined Architecture for Multi-String Matching", IEEE Computer Architecture Letters, vol. 7, issue 2, Jul. 2008.
Lin et al., "Pipelined Parallel AC-based Approach for Multi-String Matching", 14th IEEE International Conference on Parallel and Distributed Systems, Melbourne, Australia, Dec. 8-10, 2008.
Yu et al., "SSA: A Power and Memory Efficient Scheme to Multi-Match Packet Classification", Proceedings of the 2005 ACM symposium on Architecture for networking and communications systems, Princeton, USA, Oct. 26-28, 2005.
Global Technology Associates, Inc., "GB-800 / GB-800e: Small Office Firewalls supporting Mail Sentinel Anti-Spam and Anti-Virus", Data sheet, Feb. 12, 2004.
Sonicwall Inc., "SonicWALL PRO 3060 Getting Started Guide", Jun. 2005.
Stonesoft Corporation, "StoneGate Firewall/VPN", year 2009.
Juniper Networks, Inc., "SRX 5800 Specification", year 2010.
Cisco Systems, Inc., "Cisco ASA 5500 Series Firewall Edition for the Enterprise", years 1992-2006.
Song et al., "IPv6 Lookups using Distributed and Load Balanced Bloom Filters for 100Gbps Core Router Line Cards", INFOCOM 2009, Rio de Janeiro, Brazil, Apr. 19-25, 2009.
Ruiz-Sanchez et al., "Survey and Taxonomy of IP Address Lookup Algorithms", IEEE Network, Mar./Apr. 2001.
Panigrahy et al., "Reducing TCAM Power Consumption and Increasing Throughput", Proceedings of the 10th Symposium on High Performance Interconnects HOT Interconnects , pp. 107-112, Stanford, USA, Aug. 21-23, 2002.
Taylor, D., "Survey & Taxonomy of Packet Classification Techniques", May 10, 2004.
Zane et al., "CoolCAMs: Power-Efficient TCAMs for Forwarding Engines", IEEE INFOCOM 2003, San Francisco, USA, Mar. 30-Apr. 3, 2003.
Agrawal et al., "Modeling TCAM Power for Next Generation Network Devices", Proceedings of IEEE International Symposium on Performance Analysis of Systems and Software (ISPASS—2006), Austin, USA, Mar. 19-21, 2006.
Lin et al., "Route Table Partitioning and Load Balancing for Parallel Searching with TCAMs", 2007 IEEE International Parallel and Distributed Processing Symposium, Long Beach, USA, Mar. 26-30, 2007.
Hopcroft, J.E., "An N Log N Algorithm for Minimizing States in a Finite Automation", Stanford University, Jan. 1971.
Yu et al., "Gigabit Rate Packet Pattern-Matching Using TCAM", Proceedings of the 12th IEEE International Conference on Network Protocols (ICNP'04), Berlin, Germany, Oct. 5-8, 2004.
Weinsberg et al., "High Performance String Matching Algorithm for a Network Intrusion Prevention System (NIPS)", High Performance Switching and Routing, pp. 147-153, Poznan, Poland, Jun. 7-9, 2006.
Clamav, "Clam AntiVirus 0.96" User Manual, Mar. 31, 2010.
Chim et al., "Efficient Phrase-Based Document Similarity for Clustering", IEEE Transactions on Knowledge and Data Engineering, vol. 20, No. 9, pp. 1217-1229, Sep. 2008.
Zamir et al., "Web Document Clustering: A Feasibility Demonstration", Proceedings of the 21st Annual International ACM SIGIR Conference on Research and Development in Information Retrieval, pp. 47-54, Melbourne, Australia, Aug. 24-28, 1998.

* cited by examiner

1:  (*status,nextState*) = function scanAC(*state*, *byte*)
2:  *nextState* = DFA(*state*, *byte*)
3:  if *Match*(*nextState*) *!= NULL* then
4:      act according to *Match*(*nextState*)
5:      *status* = Match
6:  else
7:      if *Depth*(*nextState*) >= *CDepth* then   *status* = Check
8:      else *status* = Uncheck
9:      end if
10: end if
11: return (*status,nextState*)

FIG. 4A

12: (*nextPos, nextState*) = function scanLeft(*state, curPtrInfo*)
13: *curPos*=0
14: while (*Depth(state)* > *curPos*)and(*curPos* < *len*) do
15:     (*status, state*) = scanAC(*state, SlideWin$_{dist-curPos}$.b*)
16:     *curPtrInfo[curPos].status = status*
17:     *curPos*++
18: end while
19: return (*curPos, state*)

FIG. 4B

20: *(nextPos, nextState)* = function scanSegment(*state, start, end, curPtrInfo*)
21: Find the maximal *unchkPos*, $start \leq unchkPos \leq end$ such $SlideWin_{dist-unchkPos}.status = Uncheck$
22: If no such *unchkPos* exists *unchkPos=start*
                              ▷Continue from last scanned byte without skip
23: if *start < (unchkPos − Cdepth + 2)* then    ▷ Skip and update window
24:     *curPtrInfo[start...(unchkPos-CDepth+2)].status=SlideWin$_{dist-start...(dist-(unchkPos-CDepth+2))}$.status*
25:     *state = startStateDFA*
26:     for *curPos = (unchkPos - CDepth + 2)* to *(unchkPos)* do
                          ▷Scan bytes and copy status from *SlideWin*
27:         *(state,status)*=scanAC*(state,SlideWin$_{dist-curPos}$.b)*
28:         *curPtrInfo[curPos].status = SlideWin$_{dist-curPos}$.status*
29:     end for
30: end if
31: for curPos = unchkPos + 1 to end do     ▷ Internal or Right Boundary scan
32:     *(state, status)* = scanAC*(state, SlideWin$_{dist-curPos}$.b)*
33:     *curPtrInfo[curPos].status = status*
34: end for
35: return *(curPos+1,state)*

FIG. 4C

36: procedure ACCH(*Trf*1... *Trfn*)
37:   for i=1 to n do
38:     if *Trfi* is pointer (*dist,len*) then
39:       $curPtrInfo[0...\,len-1].b = SlideWin_{dist...dist-len}.b$
        ▷ *curPtrInfo* - an array of *byteInfo* entries, used to maintain pointer status information during pointer scan
40:       (*state, curPos*) = scanLeft(*state,curPtrInfo*)
        ▷ Check Matches within internal area
41:       while *curPos* < *len* do
42:         Find the minimal *matchPos, curPos≤matchPos<len*
        such $SlidWin_{dist-matchPos}.status$=Match
43:         if no such *matchPos* exist then   ▷ Case of Right Boundary Segment
44:           *curPos*=scanSegment(*state, curPos, len-1, curPtrInfo*)
45:         else *curPos*=scanSegment(*state, curPos, matchPos, curPtrInfo*)
        ▷ Case of Match Segment
46:         end if
47:       end while
48:       $slideWin_{len-1...0} = curPtrInfo[0...len-1]$
49:     else            ▷*Trfi* is not a pointer, performing simple byte scan
50:       $SlideWin_0.b = Trfi$
51:       (*state,status*)=scanAC(*state,SlideWin*$_{dist-i}.b$)
52:       $SlideWin_0.status = status$
53:     end if
54:   end for

Fig. 4D

1: function handleInternalMatches(*start, end*)
2: for $curPos = start$ to $(end)$ do
3:    if $SlideWin_{dist-curPos}.status$ = Match then
4:       if $MatchTable(curPos)$ contains patterns shorter or equal to $curPos$ then
5:          add those patterns to $MatchTable(absPosition)$
6:          $curPtrInfo[curPos].status$ = Match
7:       else $curPtrInfo[curPos].status$ = Check
8:       end if
9:    else
10:       $curPtrInfo[curPos].status = SlideWin_{dist-curPos}.status$
11:    end if
12: end for

FIG. 5

1:    procedure ScanText($utrf_1 ... utrf_n$)
2:    *pos* = 1
3:    Set *PartialMatch$_1$...PartialMatch$_n$* bits to *false*
4:    while *pos* + *m* <= *n* do
5:      if $utrf_{pos} ... utrf_{pos+m}$ window internal to *pointer* then
                              # Check valid areas for skipping
6:        *strt* = *pos* − *pointer.dist*
7:        *end* = *pointer.endPos* − *pointer.dist* − (*m* − 1)
8:        *pMatchList* = *findPartialMatches*(*strt ...end*)
9:        if *pMatchList* is not empty then
10:          for all *pm* in *pMatchesList* do
11:            *pos* = *pm.pos* + *pointer.dist*
12:            *PartialMatch*[*pos*] = *true*
13:            for all *pat* in $Ptrns[utrf_{pos} ... utrf_{pos+m}]$ do
14:                if $pat = utrf_{pos} ... utrf_{pos+pat.len}$ then
15:                    Handle Match found
16:                end if
17:            end for
18:          end for
19:        end if
20:      *pos* = *pointer.endPos* − (*m* − 1)

FIG. 6A

21: else         # MWM scan with *PartialMatch* updating
22:    *shiftValue= ShiftTable[utrf$_{pos+m-B}$ ...utrf$_{pos+m}$]*
23:    if *shiftValue= 0* then
24:       if *Ptrns[utrf$_{pos}$ ...utrf$_{pos+m}$]* is not empty then
25:          *PartialMatch[pos] = true*
26:          for all *pat* in *Ptrns[utrf$_{pos}$ ...utrf$_{pos+m}$]* do
27:             if *pat = utrf$_{pos}$ ...utrf$_{pos+pat.len}$* then
28:                Handle Match found
29:             end if
30:          end for
31:       end if
32:       *pos = pos + 1*
33:    else *pos = pos + shiftValue*        #*shiftValue> 0*
34:    end if
35:    end if
36: end while

FIG. 6B

MULTI-PATTERN MATCHING IN COMPRESSED COMMUNICATION TRAFFIC

CROSS-REFERENCE TO RELATED APPLICATION

This application claims the benefit of U.S. Provisional Patent Application 61/298,552, filed Jan. 27, 2010, which is incorporated herein by reference.

FIELD OF THE INVENTION

The present invention relates generally to pattern matching, and specifically to efficient application of pattern matching techniques to compressed data.

BACKGROUND OF THE INVENTION

A wide variety of methods for data compression are known in the art. Many Web servers, for example, use the GZIP algorithm to compress Hypertext Transfer Protocol (HTTP) symbol streams that they transmit. GZIP is defined in Request for Comments (RFC) 1951 of the Internet Engineering Task Force (IETF), by Deutsch, entitled, "Deflate Compressed Data Format Specification" (1996), which is incorporated herein by reference. GZIP initially compresses the symbol stream using the LZ77 algorithm, as defined by Ziv and Lempel in "A Universal Algorithm for Sequential Data Compression," *IEEE Transactions on Information Theory* (1977), pages 337-343, which is incorporated herein by reference. LZ77 operates generally by replacing recurring strings of symbols with pointers to previous occurrences. As the next stage in GZIP, the output of the LZ77 compression operation is further compressed by Huffman encoding, as is known in the art. The compressed HTTP stream is decompressed at the destination by Huffman decoding followed by LZ77 decompression.

Pattern matching algorithms are widely used in a variety of network communication applications. For example, Intrusion Detection Systems (IDS) use pattern matching in deep packet inspection. The packet content is typically checked against multiple patterns simultaneously for purposes such as detecting known signatures of malicious content.

The most common approach used at present in this type of multi-pattern matching is the Aho-Corasick algorithm, which was first described by Aho and Corasick in "Efficient String Matching: An Aid to Bibliographic Search," *Communications of the ACM* 6, pages 333-340 (1975), which is incorporated herein by reference. (The term "multi-pattern matching," as used in the context of the present patent application and in the claims, refers to scanning a sequence of symbols for multiple patterns simultaneously in a single process.) The Aho-Corasick algorithm uses a deterministic finite automaton (DFA) to represent the pattern set. The input stream is inspected symbol by symbol by traversing the DFA: Given the current state and the next symbol from the input, the DFA indicates the transition to the next state. Reaching certain "accepting states" of the DFA indicates to the IDS that the input may be malicious and should be handled accordingly.

A number of methods have been proposed for finding patterns in compressed data. For example, Navarro and Raffinot describe methods for searching a pattern in a text without uncompressing it in "A General Practical Approach to Pattern Matching over Ziv-Lempel Compressed Text," *Tenth Annual Symposium on Combinatorial Pattern Matching* (1999), which is incorporated herein by reference. Another approach of this sort is described by Farach and Thorup, in "String Matching in Lempel-Zip Compressed Strings," *27th Annual ACM Symposium on the Theory of Computing* (1995), pages 703-712, which is also incorporated herein by reference.

SUMMARY OF THE INVENTION

Embodiments of the present invention that are described hereinbelow provide methods, apparatus and software for pattern matching in compressed data.

There is therefore provided, in accordance with an embodiment of the present invention, a method for processing data, including accepting a specification of a plurality of patterns, each pattern defining a respective uncompressed sequence of symbols. Multi-pattern matching is applied to an incoming stream of compressed communication traffic containing compression metadata so as to identify the patterns occurring in the stream while using the compression metadata to skip over parts of the stream.

In a disclosed embodiment, the incoming stream includes data transmitted using a Hypertext Transfer Protocol (HTTP), which is compressed in accordance with a GZIP algorithm. Applying the multi-pattern matching may include applying Huffman decoding to the incoming stream in order to recover a symbol stream that is compressed in accordance with a LZ77 algorithm, and processing the compressed symbol stream in order to identify the patterns.

In the disclosed embodiments, the communication traffic is compressed by replacing recurring strings of the symbols with pointers to previous occurrences of the strings, and the compression metadata includes the pointers, and applying the multi-pattern matching includes searching for the patterns among the symbols of the previous occurrences, and using the pointers to skip over at least a part of the recurring strings while processing the incoming stream.

In some embodiments, applying the multi-pattern matching includes assigning respective status indicators to the symbols in previous occurrences, and referring to the status indicators to identify the symbols to skip over in the recurring strings. Typically, searching for the patterns includes traversing a deterministic finite automaton (DFA) corresponding to the patterns, and assigning the respective status indicators includes determining respective depths of the symbols with respect to the DFA, and comparing the respective depths to a depth threshold in order to assign the status indicators. Comparing the respective depths may include assigning a first status indicator to the symbols having respective depths that are less than a first depth threshold, and assigning a second status indicator to the symbols having respective depths between the first depth threshold and a second depth threshold, which is greater than the first depth threshold.

In one embodiment, the patterns include respective series of the symbols, and the DFA is constructed from the series using an Aho-Corasick algorithm. In another embodiment, the patterns are represented by a regular expression, and the DFA corresponds to the regular expression.

In a disclosed embodiment, assigning the respective status indicators includes marking the symbols at which matches to the patterns were found in the previous occurrences, and referring to the status indicators includes using the marked symbols in the recurring strings to identify positions of possible matches in the recurring strings. Typically, marking the symbols includes storing information regarding the patterns matched by each of the marked symbols in the previous occurrences, and using the marked symbols includes referring to the stored information in order to check the possible matches at the identified positions in the recurring strings.

Additionally or alternatively, using the pointers includes skipping over a recurring string when none of the patterns was matched by a previous occurrence of the string.

In an alternative embodiment, searching for the patterns includes searching for at least prefixes of the patterns in a shifting window and maintaining a record of window positions at which prefix matches were found, and using the pointers includes advancing the window responsively to the record. The search may be conducted using a Wu-Manber or modified Wu-Manber algorithm.

There is also provided, in accordance with an embodiment of the present invention, apparatus for processing data, including a memory, which is configured to store a specification of a plurality of patterns, each pattern defining a respective uncompressed sequence of symbols. A processor is configured to apply multi-pattern matching to an incoming stream of compressed communication traffic containing compression metadata so as to identify the patterns occurring in the stream while using the compression metadata to skip over parts of the stream.

There is additionally provided, in accordance with an embodiment of the present invention, a computer software product, including a computer-readable medium in which program instructions are stored, which instructions, when read by a computer, cause the computer to store a specification of a plurality of patterns, each pattern defining a respective uncompressed sequence of symbols, and to apply multi-pattern matching to an incoming stream of compressed communication traffic containing compression metadata so as to identify the patterns occurring in the stream while using the compression metadata to skip over parts of the stream.

The present invention will be more fully understood from the following detailed description of the embodiments thereof, taken together with the drawings in which:

BRIEF DESCRIPTION OF THE DRAWINGS

FIGS. 4A-4D, 5, 6A and 6B contain pseudocode listings representing algorithms used in implementing methods of multi-pattern matching, in accordance with embodiments of the present invention.

DETAILED DESCRIPTION OF EMBODIMENTS

Overview

Figure 1:
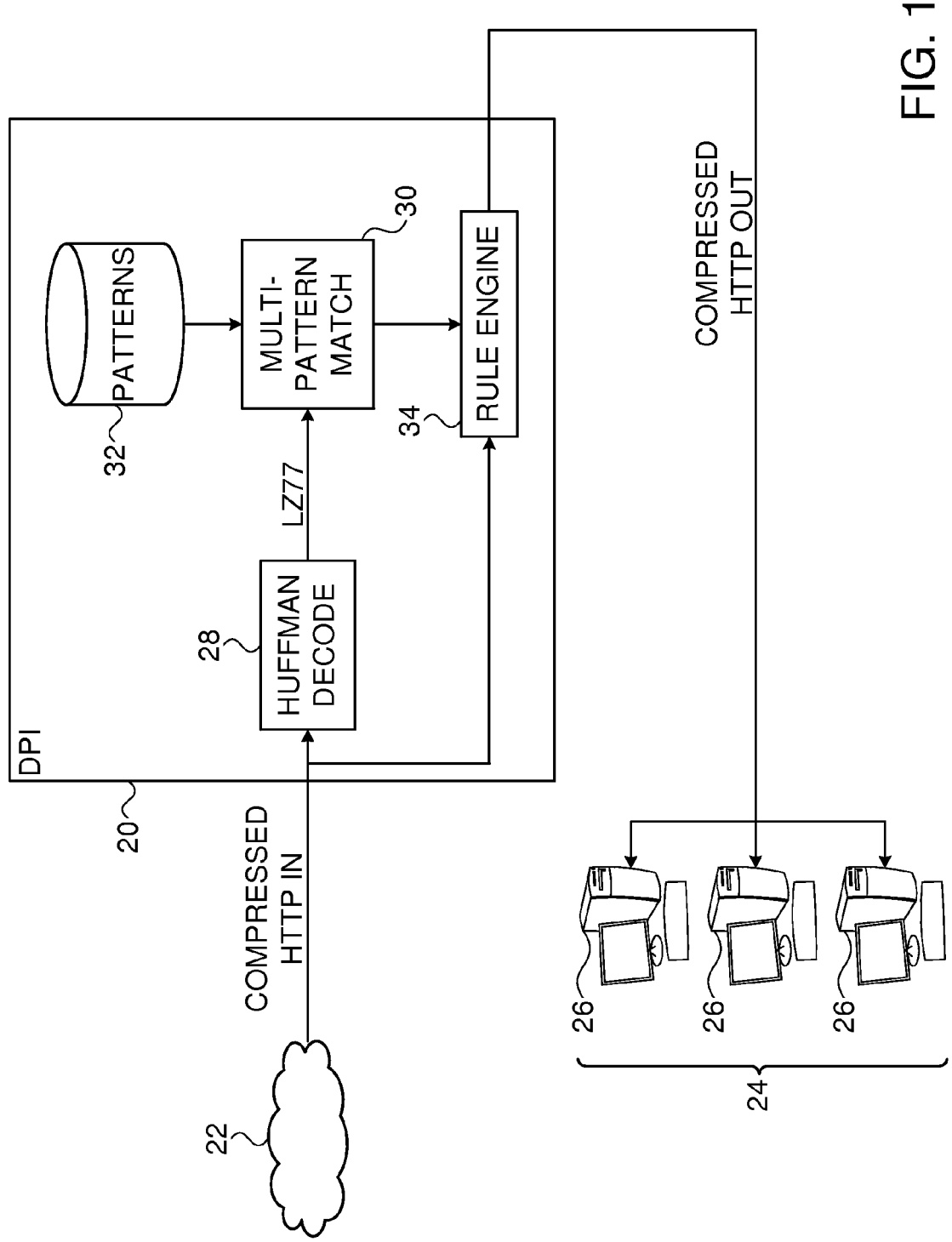
FIG. 1 is a block diagram that schematically illustrates apparatus for deep packet inspection (DPI), in accordance with an embodiment of the present invention.

Multi-pattern matching in compressed network traffic presents a number of challenges. In many applications, the network traffic is inspected on the fly, at wire speed, in order to avoid traffic backup, and it may not be possible or practical to buffer large quantities of data for processing. At the same time, popular compression methods, such as LZ77 are adaptive, meaning that the symbols used in the compressed data stream do not uniquely correspond to the symbol sequences in the original uncompressed stream. Rather, because of the use of pointers, different occurrences of the same substring in the uncompressed stream may be encoded by different symbols in the compressed stream, depending on the locations of the occurrences.

These challenges could be addressed naively by decompressing the incoming network traffic and then applying a conventional multi-pattern matching algorithm to the decompressed data. This approach, however, is costly in terms of computing power and memory requirements.

Embodiments of the present invention that are described hereinbelow address these issues by performing multi-pattern matching on the compressed data stream itself, using the compression metadata that is contained in the stream. (The term "compression metadata," as used in the context of the present patent application and in the claims, means data, such as pointers, in the compressed data stream that were not present in the original, uncompressed data, but rather reference other data for the purpose of compression. The compression metadata reveal the repetitive nature of the originally uncompressed data.) In these embodiments, a processor accepts a specification of multiple patterns, which correspond to certain uncompressed sequences of symbols, and processes an incoming stream of compressed communication traffic so as to identify the patterns in the stream. The incoming stream may comprise, for example, HTTP traffic, which is compressed in accordance with the GZIP algorithm, as described above. Alternatively, the principles of the methods described below may be applied, mutatis mutandis, to data that are compressed using other adaptive algorithms.

As explained above, LZ77 and certain other adaptive compression algorithms encode data by replacing recurring strings of symbols with pointers to previous occurrences of the strings. The presence or absence of patterns in a first occurrence of a given string, indicates whether and where the patterns will be found in recurrences of the string. Therefore, in the disclosed embodiments, when the processor reaches a pointer in the compressed data to a previous string, it uses match information from the previous string to skip over part or nearly all of the string that is referenced by the pointer, since these parts are known to contain no matches. (In general, the processor will check a small number of symbols at the beginning and end of the string, which may be the suffix or prefix, respectively, of a pattern beginning before or ending after the referenced string.)

The inventors have found that skipping over pointer-referenced data in this manner reduces substantially—by as much as 75%—the time required for multi-pattern matching in a compressed stream of data relative to the naïve approach of decompressing first and then scanning. The efficiency of the disclosed methods and their capability of detecting multiple patterns in a single pass over the data make these methods uniquely suited for on-the-fly processing of compressed network communication traffic.

System Description

FIG. 1 is a block diagram that schematically illustrates apparatus 20 for deep packet inspection (DPI), in accordance with an embodiment of the present invention. This apparatus implements the methods of multi-pattern matching in compressed data that are mentioned above, and which are described in greater detail hereinbelow. Apparatus 20 may serve, for example, as an intrusion detection system (IDS), which inspects and filters packets transmitted from a public network 22 to a private network 24. In this capacity, the apparatus checks incoming data packets based on a predefined set of patterns, and decides on the disposition of packets depending upon whether the sequences of symbols (typically bytes) that they contain match any of the patterns. It is assumed in this example, for the sake of simplicity, that the incoming data packets to apparatus contain compressed HTTP traffic, and the apparatus likewise outputs compressed HTTP traffic to destination computers 26 in network 24; but other types of compressed traffic may be handled in a similar fashion.

As noted earlier, HTTP traffic is commonly compressed using the GZIP algorithm, which uses LZ77 text compression followed by Huffman encoding. LZ77 compresses a series of symbols (which may equivalently be referred to as "bytes" or "characters") by searching for previous occurrences of each string in the series within a sliding window that contains the last 32 KB of uncompressed data. Each repeated occurrence of a given string is replaced with a pointer, in the form of a pair (distance,length), wherein distance is a number between 1 and 32,768 indicating the distance in bytes to the previous occurrence of the string, and length is a number between 3 and 258 that indicates the length of the referenced string in bytes. For example, the string: 'abcdefabcd', can be compressed to: 'abcdef(6,4)', wherein (6,4) indicates that the decoder should return six bytes and copy four bytes from that point.

Huffman coding transforms each 8-bit symbol into a variable-size codeword. The more frequent the symbol, the shorter is its corresponding codeword. In GZIP, Huffman coding replaces both ASCII characters (also referred to as "literals") and pointers with codewords using two dictionaries, one for the literals and pointer lengths and the other for the pointer distances. The Huffman dictionaries for the two alphabets appear in the block immediately after the HTTP header bits and before the actual compressed data. Huffman coding may use dynamic dictionaries for better compression, meaning that different HTTP sessions can have different dictionaries.

Upon receiving packets from network 22 containing compressed HTTP data, a Huffman decoder 28 in apparatus removes the HTTP header and stores the Huffman dictionaries for the session in question. Decoder 28 uses the dictionaries to convert the stream of Huffman codes into the corresponding symbols of the compressed LZ77 data stream.

A matching processor 30 applies multi-pattern matching to the compressed data stream, based on a specified set of patterns that is stored in a memory 32. The patterns may be stored in the form of an Aho-Corasick DFA, as described in the Background section above and explained in greater detail in the above-mentioned U.S. Provisional Patent Application 61/298,552. The DFA itself may be organized and stored in a compact form (without regard to the compression of the data stream that it processes), and processor 30 may apply this compact DFA to the literals in the compressed symbol stream, as described in U.S. patent application Ser. No. 12/985,354, filed Jan. 6, 2011, whose disclosure is incorporated herein by reference.

The patterns in memory 32 may be associated with corresponding actions, such as blocking and/or reporting packets containing certain patterns. Upon discovering a pattern or pattern in the compressed data, processor 30 instructs a rule engine 34 to take the appropriate action. (Although rule engine 34 is shown as a separate functional block from matching processor 30, in practice the functions of the rule engine may also be carried out by processor 30.) The rule engine permits packets that are not blocked to be transmitted onward to network 24, with the HTTP payloads still in their original, compressed form.

Alternatively, the patterns stored in memory 32 may have different forms, and processor 30 may apply other sorts of algorithms, as are known in the art, to the literals in the compressed data stream. For example, the patterns may have the form of regular expressions, rather than fixed strings. As another example, instead of the Aho-Corasick algorithm, the methods described below may be adapted to operate in conjunction with a shift-based pattern matching algorithm, such as a modified Wu-Manber (MWM) algorithm, as described below.

The logical functions performed by apparatus 20 (including the decision and control functions of decoder 28, processor 30, and encoder 34) are typically carried out by suitable digital logic circuits, which may comprise hard-wired and/or programmable logic components. Alternatively, at least some of these functions may be implemented in software executed by a general-purpose computer processor with suitable interfaces. This software may be downloaded to the processor in electronic form, over a network, for example. Alternatively or additionally, the software may be stored on tangible computer-readable media, such as optical, magnetic, or electronic memory.

Although FIG. 1 relates specifically to processing of compressed HTTP traffic in the context of an IDS, the principles of the present invention may similarly be applied to other types of compressed data and may be implemented not only in gateways like apparatus 20, but also in servers, host computers, and other processing nodes.

Implementation of Multi-Pattern Matching

Figure 2:
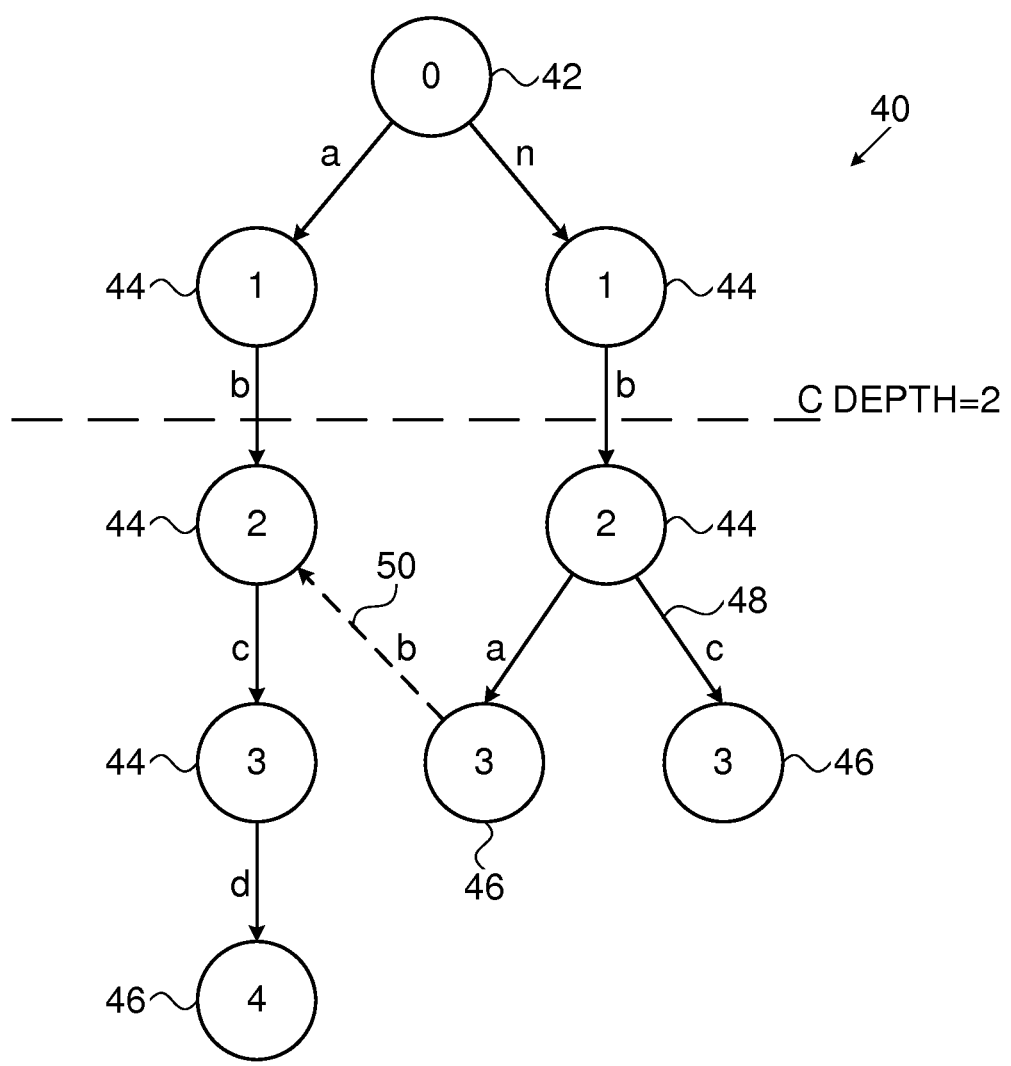
FIG. 2 is a graph that schematically illustrates a DFA, which is used in multi-pattern matching over compressed data in accordance with an embodiment of the present invention.

FIG. 2 is a graph that schematically illustrates a DFA 40, which is used in multi-pattern matching over compressed data in accordance with an embodiment of the present invention. DFA 40 is an Aho-Corasick representation of the pattern set {abcd, nba, nbc}, which may occur in sequences of the symbols in the alphabet a, b, c, d, e, n. The graph comprises a root node 42, intermediate nodes 44, and leaves 46, all corresponding to states of the DFA, with edges 48, 50 between the nodes corresponding to transitions between the states. The transitions are invoked depending on the value of the next symbol when the DFA is in a given state. The next symbol leading to each state is marked next to the corresponding edge in DFA 40. Although for the sake of simplicity, DFA 40 uses only this limited alphabet with a small number of brief patterns, the method described below may equally be applied to large, complex DFAs, with alphabets of 256 symbols, for example, and patterns that are tens or hundreds of symbols in length.

DFA 40 is constructed in two phases. First, the Aho-Corasick algorithm builds a trie of the pattern set: All the patterns are added from root 42 as chains, wherein the transition to each state is invoked by a single symbol, as noted above. Leaves 46 correspond to "accepting states" of the DFA, meaning that a corresponding pattern has been matched when the DFA reaches one of these states. When patterns share a common prefix, they also share the corresponding set of states in the trie. Edges belonging to the patterns, also known as "forward transitions," such as edge 48, are marked with solid lines in FIG. 2.

In the second phase, additional edges are added to the trie, such as edge 50, marked by a dashed line in the figure. These edges, also known as "cross transitions," correspond to situations in which the input sequence does not follow the current chain in the trie (i.e., the next symbol is not an edge of the trie) and therefore cause the DFA to transit to a different chain. In such cases, edge 50 leads to a state corresponding to a prefix of another pattern, which is equal to the longest suffix of the previously-matched symbols. Only a single cross-transition is shown in FIG. 2, and "failure transitions" (leading back to root node 42) and "restartable transitions" (leading to the first tier of nodes 44 following the root) are omitted from FIG. 2 for the sake of readability.

The following definitions are used in reference to states s in DFA 40: The depth of a state s is the length (in edges) of the shortest path between s and the root state $s_0$. The method for pattern matching in compressed data that is described below uses a depth threshold parameter CDepth, which has the value CDepth=2 in FIG. 2. States having depth less than CDepth are treated differently from states whose depth is greater than or equal to CDepth, as explained below.

Table I below shows a sample matching run over a compressed input stream Trf, which has been compressed using LZ77. (This is the sort of stream that processor might receive following Huffman decoding.) The original, uncompressed stream has symbol values corresponding to the alphabet of FIG. 2. The input stream contains a sequence of literals, followed by the pointer {8,8}, which references the string of eight literals that is enclosed in a box in the Trf row. The symbol values that are referenced by the pointer are underlined in the "Value" row of the table. The pointer is followed by further literals.

TABLE I

SAMPLE MATCHING RUN

| Trf | e | b | c | e | e | c | d | c | e | n | { | 8 | , | 8 | } | b | a |
|---|---|---|---|---|---|---|---|---|---|---|---|---|---|---|---|---|---|
| Value | e | b | c | e | e | c | d | c | e | n | b | c | e | c | d | c | e | n | b | a |
| Depth | 0 | 0 | 0 | 0 | 0 | 0 | 0 | 0 | 1 | 2 | 3 | 0 | ? | ? | ? | ? | 1 | 2 | 3 |
| Status | u | u | u | u | u | u | u | u | u | c | m | u | u | u | u | u | u | c | m |
| | | | | | | | | | | Left | | | Internal | | | | Right | | |

Processor 30 scans the compressed stream for instances of the specified patterns by traversing the graph of DFA 40. At each node, the processor records the depth, as defined above, and a status code, which may be "check" (c), "uncheck" (u), or "match" (m). The codes are used in handling pointer references, as will be explained hereinbelow. The match code indicates that the traversal of the DFA has reached an accepting state—due to the sequences "n,b,c" and "n,b,a" in the present example.

In the example shown above, the original string "b,c,e,c,d, c,e,n" contains no matches. Therefore, processor 30 can conclude that there will be no matches contained entirely inside the run of values referenced by the pointer {8,8}, and the processor can safely skip over at least a part of the referenced string. The skipped symbols are marked in the table with "?" marks. The processor may still have to check the boundary regions of the referenced string, since the prefix of the referenced string may be the suffix of a pattern that started previously (left boundary), and the suffix of the referenced string (right boundary) may be the prefix of a subsequent pattern. Thus, in the example shown in the table, the pattern "n,b,c" crosses over the left boundary of the referenced string, while the pattern "n,b,a" crosses over the right boundary.

On the other hand, when the original string contains a match, processor 30 will conclude that the string referenced by the pointer may also contain a match at the same point. In such cases, the processor could simply scan all the symbols in the referenced string as it would scan an original string of literals. In the method described below, however, the processor uses this internal match information to identify the locations of possible matches in the referenced string and skip over other parts of the string in order to accelerate the processing of the referenced symbols.

Processor 30 copies the "check," "uncheck" and "match" status indicators from the previous occurrence of the referenced string, and then updates them as appropriate as it processed the symbols in the referenced string. The "check" and "uncheck" status indicators depend on the depth of the corresponding symbol relative to the parameter CDepth: If the depth of a given symbol is known to be less than CDepth, it is marked "uncheck." If the depth may be greater than or equal to CDepth, it is marked "check." The processor uses the status indicators in deciding which symbols to scan in the left and right boundary regions of the referenced string and in the parts of the internal region of the referenced string that precede the copied match indicators, and which symbols to skip.

The processor cannot always be certain that the depth of a given symbol is greater than or equal to CDepth, since the depth of previous skipped symbols may not be known. Therefore, in cases of uncertainty, such symbols are marked which the "check" status, which may cause the processor to scan symbols that could otherwise be skipped but ensures that no pattern occurrences are missed. The value of CDepth can be chosen empirically, by evaluating different CDepth values over a sample data set to find the value that gives the best performance. In packet inspection applications, the inventors have found that a small value, such as CDepth=2, as shown in FIG. 2, gives good results. The occurrence and significance of the "check" status with this CDepth value is illustrated by the "b" symbols in the left and right boundary regions in Table I above.

When processor 30 reaches an "uncheck" symbol within the referenced string with depth less than the location (number of symbols from the left) within the string, it can safely skip over the subsequent referenced symbols. The status of the subsequent symbols within the internal region of the referenced string is then simply copied from the corresponding symbols in the original string, as illustrated in the table.

Figure 3:
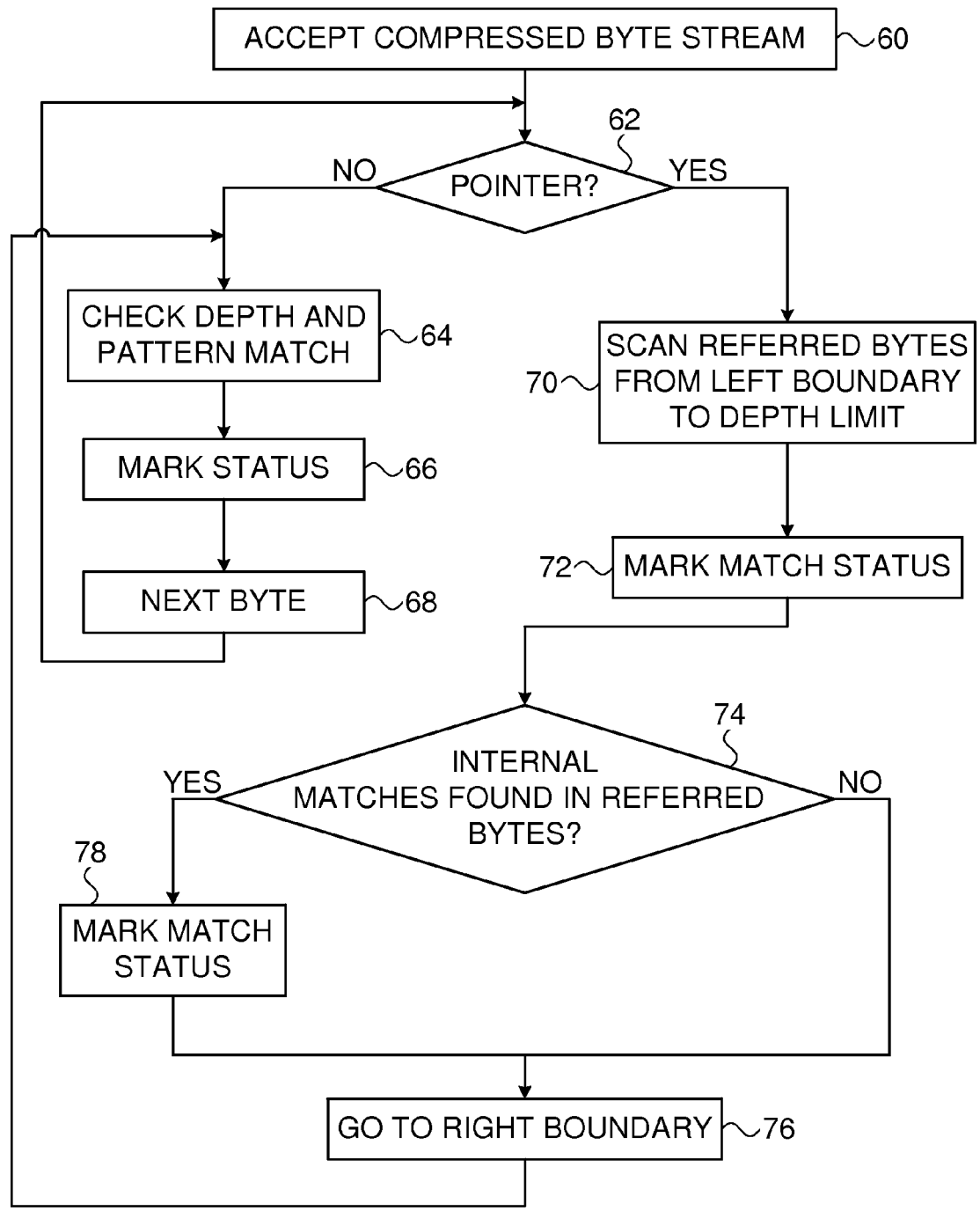
FIG. 3 is a flow chart that schematically illustrates a method for multi-pattern matching in compressed data, in accordance with an embodiment of the present invention.

Reference is now made to FIG. 3 and FIGS. 4A-4D, which schematically illustrate a method for pattern matching in compressed data, in accordance with an embodiment of the present invention. FIG. 3 is a flow chart, while FIGS. 4A-4D contain additional details of the method in the form of pseudocode. The method is described, for the sake of simplicity and clarity, with reference to the elements of system 20 (FIG. 1) and the example DFA that is shown in FIG. 2 and explained above. In practice, however, the method may be implemented in substantially any sort of pattern matching architecture that operates on suitably-compressed data and on pattern sets of arbitrary complexity. Furthermore, as noted earlier, this method is not limited to the Aho-Corasick type of DFA that is shown here, but may alternatively be applied, mutatis mutandis, to regular expressions and other sorts of pattern representations. The flow chart and pseudocode refer to symbols as "bytes," since this is the form of the symbols in compressed HTTP and most other Internet traffic.

The pseudocode in FIGS. 4A-4D uses the following definitions:

Trf is the input compressed traffic following Huffman decoding.

byteInfo is a record that contains a pair of variables: b=byte value; status=byte status.

SlideWin is a cyclic array in which each entry is of type byteInfo.

$SlideWin_j$ is the jth byte prior to the current position in SlideWin.

DFA(state,byte) is a function that receives the current state and next byte as input and returns the next state of the DFA; startStateDFA is the initial state of the DFA.

Match(state) stores information about the matched pattern if state is a match state, and is null otherwise.

Turning now to FIG. 3, processor 30 accepts a compressed byte stream, at an input step 60, and reviews the stream symbol by symbol. It checks each incoming symbol to determine whether it is a literal or a pointer, at a pointer checking step 62. For literals, the processor uses the function scanAC (FIG. 4A) to traverse the DFA and determine the depth of each successive byte, at a depth checking step 64. The processor detects matches to the patterns in the DFA when the traversal reaches one of leaves 46. It marks the status of each byte, including the depth and status indicator (match, check or uncheck, as defined above), at a marking step 66. The processor then proceeds to the next byte in the stream, at a byte increment step 68, and returns to step 62.

Upon encountering a pointer at step 62, processor begins checking the bytes at the left boundary, i.e., the beginning, of the referenced (or "referred") string, at a left boundary scanning step 70. This step uses the function scanLeft (FIG. 4B). In this step the processor continues traversing the DFA using scanAC until it reaches a byte in the referenced string where the depth of the state in the DFA after scanning the byte is less than or equal to the number of referenced bytes that have already been scanned. At this point, the processor terminates the left boundary scan and marks any pattern matches that it has found, at a left match marking step 72.

From this point forward, any internal matches within the referenced string will also have been found in the previous occurrence of the string; and if no internal matches were found in the previous occurrence of the string, then there will be no more internal matches in the referenced string. Therefore, processor 30 checks whether any of the internal bytes are marked as a match in the previous occurrence of the string, at a match checking step 74. This part of the procedure is shown in lines 41-47 of FIG. 4D. If no internal matches are found, the processor proceeds to check the right boundary region, in a right boundary scanning step 76.

If processor 30 finds at step 74 that an internal match was marked in the previous occurrence of the referenced string, it will still not be certain that the match will appear in the present occurrence, because it is possible that only the suffix of the pattern was actually contained in the previous occurrence of the string. Therefore, processor 30 applies the scanSegment function that is shown in FIG. 4C to determine whether there is a match in the present occurrence of the referenced string. In this function, the processor uses the check/uncheck status of the bytes in the referenced string that precede the byte with the match status to decide how many of these preceding bytes should be scanned. Specifically, if the position of the next byte with match status is matchPos, and the position of the last byte with uncheck status before matchPos is unchkPos, then by the definition of the uncheck status, the earliest (leftmost) position at which the next matching pattern can start is unchkPos−CDepth+2. Processor 30 therefore skips over the preceding bytes and scans forward from unchkPos, using the scanAC function described above (FIG. 4A) to determine and record the appropriate status of each byte. The processor records any matches that it finds at an internal match marking step 78. Processor 30 repeats this procedure over the bytes preceding each internal match that was marked in the previous occurrence of the referenced string, until it reaches the right boundary of the string.

At right boundary scanning step 76, processor 30 scans forward to search for matches starting from the last byte in the referenced string having uncheck status, and continuing with the bytes of the input stream following the pointer. This scan uses the routine defined in lines 31-34 of FIG. 4C. The status of each byte, including any matches, is marked as explained above. The processor then returns to step 62 and continues scanning until done.

FIG. 5 contains pseudocode illustrating a possible optimization of steps 74 and 78, in accordance with an embodiment of the present invention. This optimization uses a hash table to avoid the need for internal scans of the referenced string, with the following definitions and changes in the pseudocode of FIGS. 4A-4D:

absPosition—Absolute position from the beginning of the data.

Add after line 38 (FIG. 4D): absPosition += len

Add after line 49 (FIG. 4D): absPosition ++

MatchTable—A hash table in which each entry represents a match. The key to the table is the absPosition of the match, and the corresponding value is a list of patterns that were located at the position.

In function scanAC (FIG. 4A)—A new line is added after line 4:
add patterns in Match(state) to MatchTable(absPosition)

In procedure ACCH (FIG. 4D)—Instead of the while loop in lines 41-47, substitute:
handleInternalMatches(state, curPos, len-1)
scanSegment(state, curPos, len-1)

Function scanSegment (FIG. 4C) will ignore matches found by scanAC since all matches within the referenced string are located by the functions scanLeft and handleInternalMatches.

The function handleInternalMatches itself is presented in FIG. 5.

In the embodiment of FIG. 5, processor 30 scans the left and right boundaries of the referenced string in the manner described above, but uses the hash table to check each match status that it finds within the string. For each match that was found in the previous occurrence of the string, the hash table lists the related patterns, i.e., the patterns short enough to have engendered the match. Based on the lengths of the listed patterns, processor 30 is able to determine whether the entire pattern is contained within the referenced string—meaning that there is a match in the referenced string, or only the suffix of the pattern—meaning no match. The inventors have found this optimization to enhance the speed of processing compressed data, since it reduces the number of actual scans that are required through the states of the DFA. On the other hand, additional memory is required to maintain the hash table.

In another embodiment (not shown in the figures), the methods described above are modified to use four status indicators instead of three: Match, Check, Uncheck1 and Uncheck2. (No extra memory is required, since the same two bits can be used to represent all four statuses, rather than only three.) The two uncheck statuses are defined by two CDepth parameters, CDepth1 and CDepth2, with CDepth1<CDepth2. If the depth of a given byte that does not have a match state is less than CDepth1, that byte receives the status Uncheck1. If the depth of the byte is between CDepth1 and CDepth2, it receives the status Uncheck2. Otherwise, the byte receives the status Check. By using the two different uncheck levels, with appropriate parameters, processor 30 is able to reduce the number of scans it must perform and thus increase the number of skipped bytes, with an attendant increase in overall speed.

Based on the above definitions, the following changes are made for this embodiment in the pseudocode that is shown in FIGS. 4A and 4C:

In function scanAC—Replace line 8 with the following lines:
else if Depth(state)≦CDepth1 then status=Uncheck1
else status=Uncheck2
In function scanSegment, line 21: Instead of searching for maximal Uncheck, search for maximal Uncheck1 or Uncheck2.
In function scanSegment, lines 23-30: The CDepth parameter changes to CDepth1 or CDepth2 depending on whether the state found in line 21 is Uncheck1 or Uncheck2, respectively.

Alternative Embodiments

Support for Regular Expressions

Multiple patterns of the sort described above can in some cases be represented by regular expressions, and in an alternative embodiment of the present invention, the methods and systems described above may be adapted for multi-pattern matching over regular expressions. For the purposes of such matching, a regular expression can be represented by a DFA, as is known in the art. To apply the methods described above to a DFA representing a regular expression, the DFA is constructed so as to have the property that the depth of any state in the DFA corresponds to the longest prefix of a pattern that may occur in that state. As long as this property is maintained, processor 30 will be able to mark the Check and Uncheck status indicators correctly as it traverses the DFA.

A DFA corresponding to a regular expression may contain self-referencing groups of states, which may be traversed in a closed loop several times and thus may represent prefixes of several different lengths. For example, the expression "a(bc)*d" means that any string that starts with 'a', ends with 'd', and contains any number of 'bc' repetitions will be matched. The DFA will therefore have a looped path between the state corresponding to symbols 'b' and 'c'. This loop could be problematic if the threshold CDepth occurs at a point deeper than the loop. To resolve the problem, the loop may be "untied" by replicating the states in the loop one or more times in succession (together with any suffix states, such as 'd' in the above example), up to the point at which there are no loops between the root state and the CDepth threshold. This replication maintains the applicability of the algorithm described above, at the possible expense of an increase in the size of the DFA.

The above characteristics and adaptations also apply to other means that can be used to represent patterns, such as two-dimensional finite automata (D2FA). The methods described above may be effectively combined, for example, with the D2FA-based techniques that are described by Kumar et al., in "Algorithms to Accelerate Multiple Regular Expressions Matching for Deep Packet Inspection," *Proceedings of ACM SIGCOMM '06* (Pisa, Italy, Sep. 12-15, 2006), which is incorporated herein by reference.

Support for Other Compression Algorithms

The methods described above refer specifically to the LZ77 compression algorithm, since it is the one used in GZIP and compressed Web traffic standards. In alternative embodiments, however, these methods may be adapted, mutatis mutandis, to work with other lossless data compression algorithms, such as algorithms based on dictionary coding. Specifically, the methods for accelerating multi-pattern matching that are described above can be applied to the entire Lempel-Ziv family of compression algorithms, which includes more than ten different compression codecs. These codecs are generally derived from either the LZ77 or LZ78 algorithms and differ from the original algorithms mainly in their compression parameters, rather than in the way they represent the compressed data in terms of previous occurrences.

LZ78 compression, for example, uses back-references to locations in a given tree-style dictionary (which is constructed in the compression phase) that have been already scanned. The compression metadata in this case comprise pointers that refer to the dictionary tree leaves, as opposed to the 32 KB window of previous data used by LZ77. The multi-pattern matching principles that are applied to the window pointers in LZ77 may be applied to the tree pointers generated by the LZ78 algorithm and its derivatives.

Support for Shift-Based Pattern Matching

Although the embodiments described above use state machine models (DFA) as the basis for pattern matching, the principles of the present invention may similarly be applied in conjunction with other methods of multi-pattern matching. For example, the compression metadata may be used to accelerate shift-based multi-pattern matching techniques, such as the Modified Wu-Manber (MWM) algorithm. This algorithm itself was originally described by Wu and Manber in "A Fast Algorithm for Multi-Pattern Searching," Technical Report TR-94017, (Department of Computer Science, University of Arizona, 1994), which is incorporated herein by reference.

In the MWM algorithm and certain other shift-based methods, the symbol stream is scanned using a window of length m, which is the size of the shortest pattern to be matched. Longer patterns are trimmed to their m-symbol prefixes. When such a m-symbol prefix is found in the window, the matching processor checks the stream for an occurrence of the entire pattern, using a pattern hash table. After checking the entire pattern, the processor shifts the window one byte ahead and repeats the check. Before doing so, however, the processor determines whether the current window contains any candidate group of symbols of a predefined length B, that could be a part of an m-symbol prefix farther ahead in the stream. If not, the processor can shift the window ahead by m-B+1 symbols. Otherwise, the shift of the window is determined by the location of the candidate group of the B-symbols relative to the various prefixes, and is usually greater than one. The processor uses a shift table to determine how far to shift in each iteration, based on the B-symbol groups that it has found.

In an embodiment of the present invention, the matching processor maintains a Partial Match data structure, comprising a bit vector indicating the locations of prefix matches in data that it has already checked: The jth bit in the vector is set to true if the m symbols in the scan window at position j matched one of the m-symbol prefixes. Upon encountering a pointer in the compressed data stream, the processor checks the referenced range in the Partial Match bit vector to determine whether any partial matches occurred in the referenced data, and then advances the scan window accordingly. If there were no partial matches in the referenced data, the processor can skip over the entire referenced range (except for checking at the left and right boundaries, as in the embodiments described above). Otherwise, the processor can skip to the partial match locations within the referenced data and use the pattern hash table there to determine whether a match has occurred.

Thus, as in the case of the DFA-based methods described above, the present embodiment is able to accelerate shift-based multi-pattern matching substantially by using compression metadata to skip over parts of the input data stream.

FIGS. 6A and 6B contains pseudocode illustrating an algorithm for shift-based (MWM) multi-pattern matching on compressed data, in accordance with this embodiment of the present invention. The algorithm uses the following data structures:

$trf_1 \ldots trf_n$—the input traffic.

pos—the position of the next m-byte scan window.

ShiftTable—array that holds the shift value for each last B-bytes of the window.

Ptrns—the pattern-set hashed by the first m bytes of the patterns.

utrf—The uncompressed HTTP traffic.

pointer—Describes pointer parameters: distance, len and endPos—position of the pointer rightmost byte in the uncompressed data, received from decompression phase.

PartialMatch—Bit vector that indicate whether there is a partial match in the already-scanned traffic. Each bit in the PartialMatch vector has a corresponding byte in utrf.

findPartialMatches(strt . . . end)—Returns a list of Partial Match positions in the range strt . . . end.

The algorithm is described in detail in an Appendix below.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix—Application of Shift-Based Pattern Matching to Compressed Data

The MWM algorithm can be thought as an extension of the Boyer-Moore (BM) single-pattern-matching algorithm. In that algorithm, given a single pattern of length n to match, we look ahead in the input string by n characters. If the character at this position is not a character from the pattern, we can immediately move the search pointer ahead by n characters without examining the characters in between. If the character we look ahead to does appear in the string, but is not the last character in the search string, we can skip ahead by the largest distance that ensures that we have not missed an instance of our pattern. This technique is adapted in a straightforward manner to most implementations of shift-based multi-pattern string matching algorithms, including MWM. In the case of multi-pattern matching, the algorithm can look ahead only by the length of the shortest pattern to be matched, and the skip-ahead value for any character is the minimum of the skip-ahead values for that character in any of the individual truncated pattern segments.

The main MWM scan loop and the exact pattern matching process it implements appear in FIG. 6B (with certain modifications for operation on compressed data, as explained below). MWM starts by precomputing two tables, a skip shift table, called ShiftTable, and a pattern hash table, called Ptrns. The ShiftTable determines the shift value after each text scan. On average, MWM performs shifts larger than one, and hence it skips scanning bytes. MWM trims all patterns to their m-byte prefix, wherein m is the size of the shortest pattern. The text scan itself is performed using a virtual scan window of size m. The shift value is determined by indexing the ShiftTable with the B-byte suffix of the scan window (line 22 in FIG. 6B).

The values in the ShiftTable determine how far we can shift forward (skip) in scanning the text. Let $X_1 \ldots X_B$ be the B characters in the text that we are currently scanning. If X does not appear as a substring in any m-byte prefix, we can make the maximal shift, m-B+1 bytes. If X appears in some prefixes, we find the rightmost occurrence of X in any of the prefixes. Assuming that X ends at position q of some prefix, and that X does not end at any position greater than q in any other pattern, we shift by m-q bytes. Generally, the values in the shift table are the largest possible safe values for shifts.

When the ShiftTable returns with a value of 0, all m-bytes of the scan window are indexed into the Ptrns hash table to find a list of references to possible matching patterns. These patterns are compared to the text in order to find any matches (lines 23-33 in FIG. 6B). Then the input is shifted ahead by one byte and the scan process continues.

Multi-pattern shift-based matching in compressed HTTP traffic uses a combined technique that scans uncompressed portions of the data using MWM and skips scanning most of the data represented by the LZ77 pointers. The scanning is performed on decompressed data, with both decompression and scanning tasks performed on-the-fly, but we always keep the metadata of recent pointers to accelerate scanning. For simplicity and clarity, the pseudocode in FIGS. 6A and 6B assumes that all the uncompressed text and additional metadata are kept in memory. In practical implementations, however, it is enough to store only the last 32 KB of the uncompressed traffic.

Patterns occurring at the boundaries of referenced areas necessitate re-scanning of the boundary regions even if no patterns were found in the initial scan of the referenced data. The reason is that a prefix of the referred bytes may be a suffix of a pattern that started previously to the pointer; or a suffix of the referred bytes may be a prefix of a pattern that continues after the pointer. It is therefore important to handle pointer boundaries correctly and to maintain MWM characteristics while skipping data represented by LZ77 pointers.

The algorithm shown in FIGS. 6A and 6B integrates smoothly with MWM. As long as the scan window is not fully contained within pointer boundaries, a regular MWM text scan is performed (lines 22-34), with the addition of updating the PartialMatch bit vector (line 25). The jth bit in the vector is set to true if in position j, the m bytes of the scan window match an m-byte prefix of a pattern.

If the m-byte scan window shifts into a position where it is fully contained within pointer boundaries, the algorithm of FIG. 6A examines the pointer for valid areas for skipping (lines 6-20). The MWM algorithm locates patterns that start within its scan window, and the window moves only forward during the scan process. Therefore, at any point in the scan, all patterns that occurred prior to current position of the scan window must have already been located by MWM. Once the scan window has shifted into pointer boundaries, any case in which the prefix of a referred bytes is a suffix of a pattern that started previously to the pointer should have been located by the algorithm before the scan window shifted entirely into the pointer boundaries.

The algorithm of FIG. 6A checks whether any partial match occurred within the referred bytes by calling the function findPartialMatches(line 8). In the simple case in which there were no partial matches found, we can safely shift the scan window to the end of the referred bytes, so that it contains m-1 bytes from the pointer suffix (line 20). Any point prior to this location is guaranteed to be free of partial matches.

If findPartialMatches returns any partial matches, we can be certain that they were copied entirely from the referred bytes. Therefore, we start by setting the corresponding positions within the PartialMatch bit-vector to true (line 12). For each partial match, we then query the Ptrns hash table to check whether an exact match occurs, in the same way as in MWM (lines 13-17).

The algorithm of FIGS. 6A and 6B is readily implemented over a cyclic 32 KB buffer. GZIP backward pointers refer to positions that are at distance of at most 32 KB back from the pointer position. Therefore, there is no need to keep the entire session and its corresponding metadata in memory. The data that the processor maintains for the last 32 KB include the traffic itself and the last 32K bits of the PartialMatch bit-vector. Both data structures are kept together, such that for each uncompressed byte (8-bit) we keep an additional bit that indicate whether a partial match starts at that byte. This packing gains better performance due to spatial locality of both data structures, i.e., in the general case, only one memory access is required to access both the data and the metadata. All together, we keep 36 KB of memory per session.

Shift-based pattern matching algorithms, such as those described above, are sensitive to the shortest pattern length, since it defines the maximal shift value for the algorithm. To increase the efficiency of the algorithm, short patterns may be consolidated into other, longer patterns or may otherwise be treated separately.

The invention claimed is:

1. A method for processing data, comprising:
accepting a specification of a plurality of patterns, each pattern defining a respective uncompressed sequence of symbols; and
applying multi-pattern matching to an incoming stream of compressed communication traffic containing compression metadata so as to identify the patterns occurring in the stream while using the compression metadata to skip over parts of the stream,
wherein the communication traffic is compressed by replacing recurring strings of the symbols with pointers to previous occurrences of the strings, and the compression metadata comprises the pointers, and
wherein applying the multi-pattern matching comprises searching for the patterns among the symbols of the previous occurrences, and using the pointers to skip over at least a part of the recurring strings while processing the incoming stream, while assigning respective status indicators to the symbols in previous occurrences, and referring to the status indicators to identify the symbols to skip over in the recurring strings,
wherein searching for the patterns comprises traversing a deterministic finite automaton (DFA) corresponding to the patterns, and wherein assigning the respective status indicators comprises determining respective depths of the symbols with respect to the DFA, and comparing the respective depths to a depth threshold in order to assign the status indicators.

2. The method according to claim 1, wherein the incoming stream is compressed in accordance with a GZIP algorithm.

3. The method according to claim 2, wherein the incoming stream comprises data transmitted using a Hypertext Transfer Protocol (HTTP).

4. The method according to claim 2, wherein applying the multi-pattern matching comprises applying Huffman decoding to the incoming stream in order to recover a symbol stream that is compressed in accordance with a LZ77 algorithm, and processing the compressed symbol stream in order to identify the patterns.

5. The method according to claim 1, wherein comparing the respective depths comprises assigning a first status indicator to the symbols having respective depths that are less than a first depth threshold, and assigning a second status indicator to the symbols having respective depths between the first depth threshold and a second depth threshold, which is greater than the first depth threshold.

6. The method according to claim 1, wherein the patterns comprise respective series of the symbols, and wherein the DFA is constructed from the series using an Aho-Corasick algorithm.

7. The method according to claim 1, wherein the patterns are represented by a regular expression, and wherein the DFA corresponds to the regular expression.

8. The method according to claim 1, wherein assigning the respective status indicators comprises marking the symbols at which matches to the patterns were found in the previous occurrences, and wherein referring to the status indicators comprises using the marked symbols in the recurring strings to identify positions of possible matches in the recurring strings.

9. The method according to claim 8, wherein marking the symbols comprises storing information regarding the patterns matched by each of the marked symbols in the previous occurrences, and wherein using the marked symbols comprises referring to the stored information in order to check the possible matches at the identified positions in the recurring strings.

10. The method according to claim 1, wherein using the pointers comprises skipping over a recurring string when none of the patterns was matched by a previous occurrence of the string.

11. The method according to claim 1, wherein searching for the patterns comprises searching for at least prefixes of the patterns in a shifting window and maintaining a record of window positions at which prefix matches were found, and wherein using the pointers comprises advancing the window responsively to the record.

12. Apparatus for processing data, comprising:
a memory, which is configured to store a specification of a plurality of patterns, each pattern defining a respective uncompressed sequence of symbols; and
a processor, which is configured to apply multi-pattern matching to an incoming stream of compressed communication traffic containing compression metadata so as to identify the patterns occurring in the stream while using the compression metadata to skip over parts of the stream,
wherein the communication traffic is compressed by replacing recurring strings of the symbols with pointers to previous occurrences of the strings, and the compression metadata comprises the pointers, and
wherein the processor is configured to search for the patterns among the symbols of the previous occurrences, and to use the pointers to skip over at least a part of the recurring strings while processing the incoming stream, and
wherein the processor is configured to assign respective status indicators to the symbols in previous occurrences, and to refer to the status indicators to identify the symbols to skip over in the recurring strings, and
wherein the processor is configured to search for the patterns by traversing a deterministic finite automaton (DFA) corresponding to the patterns, and to assign the respective status indicators by determining respective depths of the symbols with respect to the DFA, and comparing the respective depths to a depth threshold in order to assign the status indicators.

13. The apparatus according to claim 12, wherein the incoming stream is compressed in accordance with a GZIP algorithm.

14. The apparatus according to claim 13, wherein the incoming stream comprises data transmitted using a Hypertext Transfer Protocol (HTTP).

15. The apparatus according to claim 13, wherein the apparatus comprises a decoder, which is configured to apply Huffman decoding to the incoming stream in order to recover a symbol stream that is compressed in accordance with a LZ77 algorithm, which is processed by the processor in order to identify the patterns.

16. The apparatus according to claim 12, wherein comparing the respective depths comprises assigning a first status indicator to the symbols having respective depths that are less than a first depth threshold, and assigning a second status indicator to the symbols having respective depths between the first depth threshold and a second depth threshold, which is greater than the first depth threshold.

17. The apparatus according to claim 12, wherein the patterns comprise respective series of the symbols, and wherein the DFA is constructed from the series using an Aho-Corasick algorithm.

18. The apparatus according to claim 12, wherein the patterns are represented by a regular expression, and wherein the DFA corresponds to the regular expression.

19. The apparatus according to claim 12, wherein the processor is configured to assign the respective status indicators by marking the symbols at which matches to the patterns were found in the previous occurrences, and to use the marked symbols in the recurring strings to identify positions of possible matches in the recurring strings.

20. The apparatus according to claim 19, wherein the processor is configured to store information regarding the patterns matched by each of the marked symbols in the previous occurrences, and to refer to the stored information in order to check the possible matches at the identified positions in the recurring strings.

21. The apparatus according to claim 12, wherein the processor is configured to skip over a recurring string when none of the patterns was matched by a previous occurrence of the string.

22. The apparatus according to claim 12, wherein the processor is configured to search for at least prefixes of the patterns in a shifting window, to maintain a record of window positions at which prefix matches were found, and to advance the window responsively to the record.

23. A computer software product, comprising a non-transitory computer-readable medium in which program instructions are stored, which instructions, when read by a computer, cause the computer to store a specification of a plurality of patterns, each pattern defining a respective uncompressed sequence of symbols, and to apply multi-pattern matching to an incoming stream of compressed communication traffic containing compression metadata so as to identify the patterns occurring in the stream while using the compression metadata to skip over parts of the stream, wherein the communication traffic is compressed by replacing recurring strings of the symbols with pointers to previous occurrences of the strings, and the compression metadata comprises the pointers, and wherein the instructions cause the computer to search for the patterns among the symbols of the previous occurrences, and to use the pointers to skip over at least a part of the recurring strings while processing the incoming stream, and wherein the instructions cause the computer to assign respective status indicators to the symbols in previous occurrences, and to refer to the status indicators to identify the symbols to skip over in the recurring strings, and wherein the instructions cause the computer to search for the patterns by traversing a deterministic finite automaton (DFA) corresponding to the patterns, and to assign the respective status indicators by determining respective depths of the symbols with respect to the DFA, and comparing the respective depths to a depth threshold in order to assign the status indicators.

24. The product according to claim 23, wherein the incoming stream is compressed in accordance with a GZIP algorithm.

25. The product according to claim 24, wherein the incoming stream comprises data transmitted using a Hypertext Transfer Protocol (HTTP).

26. The product according to claim 24, wherein the instructions cause the computer to apply Huffman decoding to the incoming stream in order to recover a symbol stream that is compressed in accordance with a LZ77 algorithm, which is processed by the computer in order to identify the patterns.

27. The product according to claim 23, wherein comparing the respective depths comprises assigning a first status indicator to the symbols having respective depths that are less than a first depth threshold, and assigning a second status indicator to the symbols having respective depths between the first depth threshold and a second depth threshold, which is greater than the first depth threshold.

28. The product according to claim 23, wherein the patterns comprise respective series of the symbols, and wherein the DFA is constructed from the series using an Aho-Corasick algorithm.

29. The product according to claim 23, wherein the patterns are represented by a regular expression, and wherein the DFA corresponds to the regular expression.

30. The product according to claim 23, wherein the instructions cause the computer to assign the respective status indicators by marking the symbols at which matches to the patterns were found in the previous occurrences, and to use the marked symbols in the recurring strings to identify positions of possible matches in the recurring strings.

31. The product according to claim 30, wherein the instructions cause the computer to store information regarding the patterns matched by each of the marked symbols in the previous occurrences, and to refer to the stored information in order to check the possible matches at the identified positions in the recurring strings.

32. The product according to claim 23, wherein the instructions cause the computer to skip over a recurring string when none of the patterns was matched by a previous occurrence of the string.

33. The product according to claim 23, wherein the instructions cause the computer to search for at least prefixes of the patterns in a shifting window, to maintain a record of window positions at which prefix matches were found, and to advance the window responsively to the record.

* * * * *